Nov. 21, 1967  J. REDEL ET AL  3,354,224
PROCESS OF PREPARING β-IONYLIDENE ACETALDEHYDE
Filed March 13, 1964
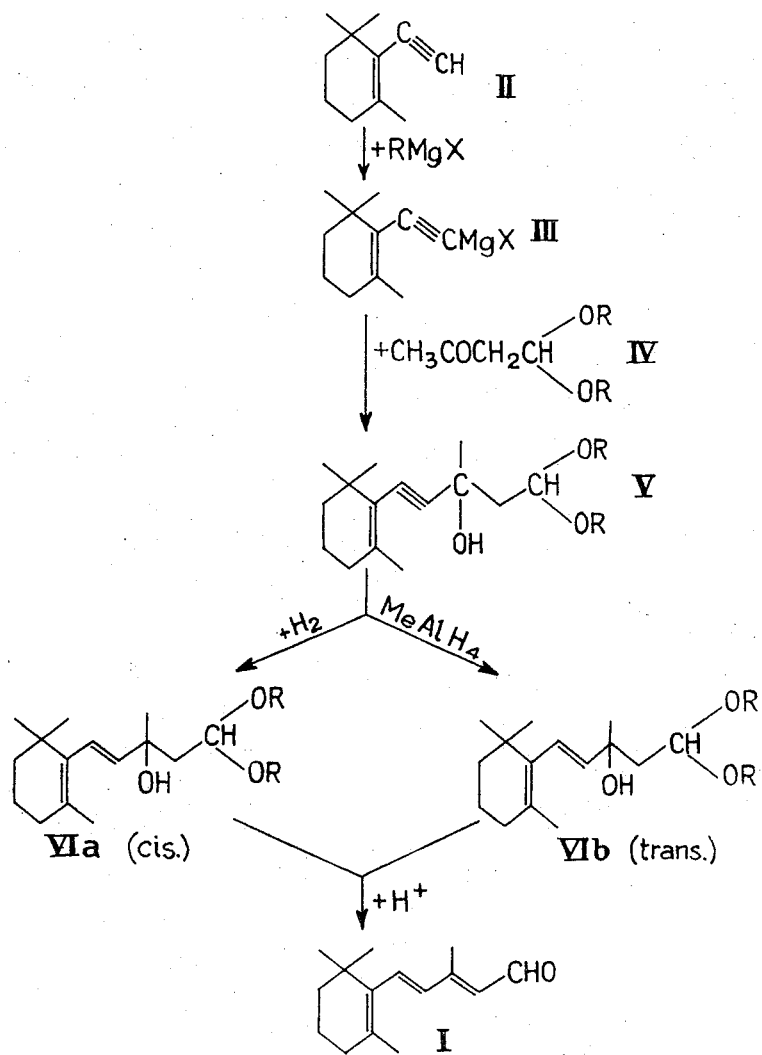

United States Patent Office 3,354,224
Patented Nov. 21, 1967

3,354,224
PROCESS OF PREPARING β-IONYLIDENE ACETALDEHYDE
Joseph Redel and Jean-Baptiste-Christian Boch, Neris-les-Bains, France, assignors to A. E. C. Societe de Chimie Organique et Biologique, Commentry, Allier, France, a corporation of France
Filed Mar. 13, 1964, Ser. No. 351,624
Claims priority, application France, Mar. 15, 1963, 928,126
7 Claims. (Cl. 260—611)

The present invention relates to the preparation of β-ionylideneacetaldehyde having the Formula I shown in FIG. 1 of the accompanying drawing.

This compound is an important intermediary in the synthetic preparation of vitamin A, several methods having been described for converting β-ionylideneacetaldehyde into vitamin A. Among these methods there may be mentioned that of Huisman (Rec. Trav. Chim. Pays Bas, 1956, 75, 977), that of Robeson and Coll. (J. Am. Chem. Soc. 1955, 77, 4111) and that of the applicant (French Patent 1,243,984 filed July 6, 1959).

β-Ionylideneacetaldehyde is prepared however in all known commercial processes from β-ionone (cf. Heilbron & Weedon, Bull. Soc. Chim., 1958, 91), the latter being obtained either from natural lemongrass essence by partial synthesis or entirely synthetically. In both cases it has the drawback of being costly and subject to large fluctuations.

There has therefore been a need for a process of preparing β-ionylideneacetaldehyde from a compound other than β-ionone which would thus avoid the drawbacks of presently known processes.

This is the object of the present invention.

The invention provides a process of preparing β-ionylideneacetaldehyde comprising converting 1-ethynyl, 2,6,6-trimethyl cyclohexene into the corresponding Grignard magnesium derivative, condensing said magnesium derivative with a β-ketobutyraldehyde ketal such as $CH_3COCH_2CH(OR_1)_2$, wherein $R_1$ is a lower alkyl group, so as to obtain a $C_{15}$ acetylenic hydroxy-ketal, partially hydrogenating the latter into the corresponding ethylenic hydroxy-ketal which by hydrolysis accompanied by a dehydration is converted into β-ionylideneacetaldehyde.

The sequence of the foregoing stages, which will now be examined in detail, is illustrated by FIG. 2 in the drawing.

1-ethylnyl, 2,6,6-trimethyl cyclohexene (II), which serves as the starting material, can be obtained from 2,6,6-trimethyl cyclohexanone by the known methods (cf. Attenburrow et al. J. Chem. Soc., 1952 1094; Julia and Descoins, Bull. Soc. Chim. 1962 1939).

In the first stage of the process, the compound (II) is subjected to an exchange reaction with a Grignard reagent of formula RMgX, where R is a lower alkyl group (for example methyl or ethyl) and X bromine or chlorine. The reaction is carried out in the conventional manner in an ether, such as diethyl ether or tetrahydrofurane.

The magnesium derivative (III) thus obtained is condensed in the second stage of the process with a β-ketobutyraldehyde ketal (IV), where R is a lower alkyl group. The condensation is advantageously carried out by adding the compound (IV) to the reactional medium wherein the magnesium derivative is formed (III) and by moderately heating if necessary. In this way a $C_{15}$ acetylenic hydroxyketal is obtained (V) which can be easily purified by molecular distillation.

In the third stage of the process, the compound (V) is partially hydrogenated so as to convert its treble bond into a double bond. This hydrogenation can be carried out in two ways.

In the first way, the compound (V) is hydrogenated catalytically, the catalyst being deactivated so as to avoid a complete hydrogenation of the treble bond, which is to say that the catalyst is partially deactivated. Thus this hydrogenation is carried out in the presence of Raney nickel which has been deactivated by a zinc acetate-piperidine mixture (cf. Oroshnik et al., J. Amer. Chem. Soc., 1952, 74, 295) or by piperidine alone, or in the presence of palladium on a suitable support (for example on charcoal or calcium carbonate) deactivated by the addition of quinoline or pyridine (cf. Isler et al., Helv. Chim. Acta 1947, 30 1911). The solvents employed for this hydrogenation are alcohols (methanol, ethanol, isopropanol), ethyl acetate and petroleum ether, the reaction being effected at a temperature between 0° and 60° C. The catalysts are employed in the proportion of 5–20% relative to the substance to hydrogenate, the consumption of hydrogen slowing down greatly or completely stopping after the absorption of about 1 mole. Under these conditions, the cis isomer of $C_{15}$ olefinic hydroxy-ketal (IVa) is obtained in accordance with the literature (cf. Raphael, "Acetylenic compounds in organic synthesis," London, 1955, p. 23–25). It is indeed known that the catalytic reduction of the treble bond results in cis olefin.

In the second way, the compound (V) is hydrogenated by a hydride of aluminium and of an alkali metal $MeAlH_4$, in which Me is an alkali metal such as lithium or sodium. The hydrogenation is conveniently carried out in solution in tetrahydrofurane. There is then formed trans $C_{15}$ olefinic hydroxy-ketal (VIb) in accordance with the literature (cf. Raphael loc. cit., p. 202). It is indeed known that the reduction of the treble bond by aluminum lithium hydride results in the trans olefinic derivative.

In the last stage of the process, the olefinic hydroxy-ketal whether it is cis (VIa) or trans (VIb) is subjected to a hydrolysis which is accompanied by a dehydration. This hydrolysis is carried out by a hydrohalic acid, preferably hydrochloric acid in solution in acetone, methylethylketone, dimethyl formamide or acetonitrile. β-ionylidineacetaldehyde (I) is obtained. It will be observed that ketal (VIb) and it conversion into β-ionylideneacetaldehyde by the action of hydrochloric acid in acetone are described in the French Patent No. 1,243,824.

On the other hand, ketal (VIa) is a new compound. $C_{15}$ acetylenic hydroxy-ketal (V) is also new. These new compounds are also covered by the invention.

The following examples are intended to illustrate the invention, it being understood that the latter is not intended to be limited thereby.

*Example 1.—5 - (2',6',6' - trimethyl cyclohexen - 1' - yl)3-methyl 3-hydroxy 1,1-dimethoxy 4-pentyne (V, R=CH₃)*

(a) There are added slowly at room temperature to a magnesium derivative prepared in the usual way from 9.9 g. of magnesium, 45.5 g. of ethyl bromide in 146 cc. of anhydrous tetrahydrofurane, 45 g. of ethynyl trimethylcyclohexene (compound II), $\lambda_{max.} = 230\ m\mu - E_{1\ cm}^{1\%} = 757$ in isopropanol (Attenburrow and Coll., J. Chem. Soc., 1952, 1094, Julia and Déscoins, Bull. Soc. Chim., 1962, 1939). The mixture is stirred for 2 hours at room temperature. At the end of this period, the volume of ethane collected is practically the theoretical volume. 900 cc. of anhydrous ether are added which are cooled in an iced water bath and there is slowly introduced a solution of 54 g. of β-keto-butyraldehyde dimethyl ketal (IV, R=CH₃ commercial product) in 540 cc. of ether. Stirring is continued over night at room temperature under nitrogen.

The mixture is cooled, decomposed by means of a saturated solution of ammonium chloride, washed with water until neutral, dried on sodium sulphate, concentrated and distilled under a molecular vacuum.

Mid portion: B.P.$_{0.05\ mm.}$=150° C. Weight: 72 g.

$\lambda_{max.}$=235 m$\mu$ $E^{1\%}_{1\ cm.}$=483 (isopropanol)

Percent OCH$_3$ (Zeisel): calculated, 22.14; found: 21.63. $n_D^{20}$=1.494.

Analysis.—C$_{17}$H$_{28}$O$_3$; M.W.=280.39. Calculated: C, 72.85%; H, 10.00%. Found: C, 73.12%; H, 9.89%.

(b) One iodine crystal is added to 0.55 g. of magnesium turnings covered with 5.5 cc. of anhydrous tetrahydrofurane and a slow current of methyl chloride is passed therethrough. Once the magnesium derivative is formed, there are slowly added at room temperature 2.5 g. of ethynyl-trimethylcyclohexene ($E^{1\%}_{1\ cm.}$=757)

in 2.5 cc. of tetrahydrofurane. The mixture is rendered luke warm and stirred for about 1 hour, the volume of methane collected is then practically the theoretical volume.

The mixture is cooled by a bath of iced water and there is slowly added a solution of 3 g. of C$_4$ keto-ketal or dimethyl ketal of β-keto-butyraldehyde (IV, R=CH$_3$) (commercial product) in 18 cc. of anhydrous tetrahydrofurane.

The stirring is continued overnight at room temperature under nitrogen.

The mixture is cooled, decomposed by means of a saturated solution of ammonium chloride, extracted with ether, washed with water until neutral, dried on sodium sulphate, and concentrated at atmospheric pressure and then at 0.1 mm.

Weight=4.45 g. $\lambda_{max.}$=235 m$\mu$.

$E^{1\%}_{1\ cm.}$=465 (isopropanol)

Percent OCH$_3$ (Zeisel): Calculated, 22.14. Found, 20.58. $n_D^{20}$=1.494.

*Example 2.*—5 - (2',6',6' - trimethyl cyclohexen - 1' - yl)3-methyl 3-hydroxy 1,1-diethoxy 4-pentyne (V, R=C$_2$H$_5$)

A solution of 2.5 g. of ethynyl-trimethyl-cyclohexene ($E^{1\%}_{1\ cm.}$=757)

in 2.5 cc. of tetrahydrofurane is slowly added at room temperature to a magnesium derivative prepared in the usual manner from 0.55 g. of magnesium, 2.53 g. of ethyl bromide and 5.5 cc. of tetrahydrofurane. After stirring for one hour, the ethane collected is the theoretical amount.

The mixture is cooled by an iced bath, 60 cc. of anhydrous ether are added and then a solution of 3.75 g. of β-keto-butyraldehyde diethyl ketal (IV, R=C$_2$H$_5$) (Sugasawa et al., J. Pharm. Soc. Japan 1949, 69, 82) in 37 cc. of anhydrous ether is slowly added. Stirring is continued overnight at room temperature. The mixture is cooled, decomposed by means of a saturated solution of ammonium chloride, washed with water until neutral, dried and concentrated at atmospheric pressure and then at 0.1 mm.

Weight=5.06 g. $\lambda_{max.}$=235 m$\mu$.

$E^{1\%}_{1\ cm.}$=410 (isopropanol)

Percent OC$_2$H$_5$ (Zeisel): Calculated, 29.2. Found, 28.4. $n_D^{20}$=1.483.

*Example 3.*—5 - (2',6',6' - trimethyl cyclohexen-1'-yl) 3-methyl 3-hydroxy 1,1-dimethoxy 4-pentene or cis C$_{15}$ hydroxyketal (VIa)

(a) 0.5 g. of C$_{15}$ acetylenic-hydroxyketal (compound V obtained in Example 1, $E^{1\%}_{1\ cm.}$=469)

in solution in 5 cc. of ethanol are hydrogenated at 50° C. while stirring in the presence of 0.05 g. of Raney Ni and 1.94 mg. of zinc acetate and 0.039 cc. of piperidine. Stirring is continued until the absorption of hydrogen corresponding to one mole ceases.

The mixture is filtered, the nickel is rinsed with alcohol, and the combined filtrates are thrown into water, extracted with ether, neutralized and then washed with water until neutral, dried and concentrated.

Weight =0.49 g. $\lambda_{max.}$=212 m$\mu$. $n_D^{20}$=1.482.

$E^{1\%}_{1\ cm.}$=166 (isopropanol)

Percent OCH$_3$ (Zeisel): Calculated, 22.00. Found, 20.68.

The absence of acetylenic product is verified by a thin layer chromatography on a silica gel in accordance with Stahl.

(b) 9 g. of C$_{15}$ acetylenic β-hydroxyketal ($E^{1\%}_{1\ cm.}$=469)

in solution in 45 cc. of ethanol are hydrogenated while stirring at room temperature in the presence of 0.9 g. of Raney Ni and 0.045 cc. of piperidine. Stirring is continued until the absorption of hydrogen ceases.

The mixture is filtered, the nickel is rinsed with alcohol, the combined filtrates are thrown into water, extracted with ether, neutralized and then washed with water until neutral dried and concentrated.

Weight=8.89 g. B.P.$_{0.1\ mm.}$=90–95° $\lambda_{max.}$=212 m$\mu$.

$E^{1\%}_{1\ cm.}$=154 (isopropanol)

Analysis.—C$_{17}$H$_{30}$O$_3$; M.W.=282.41. Calculated: C, 72.49%; H, 10.70%. Found: C, 72,49, 72.48%; H, 10.45, 10.47%.

Percent OCH$_3$ (Zeisel): Calculated, 22.00. Found, 21,84, 22.03.

The absence of acetylenic product is verified by a thin layer chromatography on silica gel in accordance with Stahl's method.

(c) 25 g. of C$_{15}$ acetylenic hydroxyketal (E$_{235\ m\mu}$=485) in solution in 125 cc. of ethyl acetate are hydrogenated at atmospheric pressure at 20° C. in the presence of 2.5 g. of palladium on 5% charcoal and 1.5 cc. of quinoline.

At the end of 4 hr. 30 min. the absorption of hydrogen stops completely. The mixture is filtered on sintered glass, extracted with ether, washed several times with 5% sulphuric acid, once with bicarbonate and then with water until neutral, dried and concentrated.

Weight: 24.72 g. $\lambda_{max.}$=210–211 m$\mu$. $n_D^{20}$=1.486.

$E^{1\%}_{1\ cm.}$=182 (isopropanol)

The absence of acetylenic product is verified by a thin layer chromatography on silica gel in accordance with Stahl's method.

*Example 4.*—5-(2',6',6'-trimethyl cyclohexen-1'-yl) 3-methyl 1,1-dimethoxy 4-pentene or trans C$_{15}$ hydroxyketal (VIb, R=CH$_3$)

A solution of 10 g. of C$_{15}$ acetylenic hydroxy ketal (V, $E^{1\%}_{1\ cm.}$=464)

in 60 cc. of tetrahydrofurane is added drop by drop to 1 g. of aluminium-lithium hydride in suspension in 50 cc. of tetrahydrofurane. The mixture is then refluxed for 6 hours. The mixture is cooled to 0° C., decomposed by means of a saturated solution of ammonium chloride, filtered and poured into water. It is extracted with ether, washed with water until neutral, dried on sodium sulphate, concentrated at low pressure and distilled at 0.1 mm.

B.P.$_{0.1\ mm.}$=104–106° C. Weight=7.7 g. $\lambda_{max.}$=235 m$\mu$.

$E^{1\%}_{1\ cm.}$=203 (isopropanol)

Percent OCH$_3$ (Zeisel): Calculated, 22.00. Found, 21.1. $n_D^{20}$=1.486.

*Example 5.*—5-(2',6',6'-trimethyl cyclohexen-1'-yl) 3-methyl 2,4 al-1-pentadiene or β-ionylidene-acetaldehyde (I)

1 g. of cis C$_{15}$-β-hydroxy-ketal (VIa) ($\lambda_{max.}$=212 m$\mu$ $E^{1\%}_{1\ cm.}$=203 in isopropanol)

is put into solution in 7.5 cc. of methyl-ethyl-ketone. 0.26 cc. of N hydrochloric acid is added and refluxed for 30 minutes. The mixture is thrown into iced water, neutralized with bicarbonate, extracted with ether, washed with water, dried and concentrated.

Weight=0.8 г.

$\lambda_{max.}=325$ m$\mu$ $E_{1\ cm.}^{1\%}=517$ (isopropanol)

$\lambda_{max.}=285$ m$\mu$ $E_{1\ cm.}^{1\%}=460$

In the same way, the trans $C_{15}$ hydroxy-ketal (VIb) obtained in Example 4 can be converted into β-ionylideneacetaldehyde (I).

It must be understood that the invention is not intended to be limited by the foregoing examples which have been given only by way of illustration.

Having now described our invention what we claim as new and desire to secure by Letters Patent is:

1. A process of preparing an ethylenic hydroxy-ketal consisting of a 5-(2',6',6'-trimethyl cyclohexen-1'-yl) 3-methyl 3-hydroxy 1,1-di-lower alkoxy 4-pentene, comprising converting 1-ethynyl 2,6,6-trimethyl cyclohexene into the corresponding Grignard reagent by reaction with a Grignard reagent having the formula RMgX, in which R is a lower alkyl group and X is a halogen selected from the group consisting of bromine and chlorine, in an ether, condensing said Grignard reagent so formed with a β-ketobutyraldehyde ketal, hydrolyzing the resulting reaction product thereby obtaining a $C_{15}$ acetylenic hydroxy-ketal, and partially hydrogenating the latter by catalytic hydrogenation at a temperature between about 0 and 60° C. in the presence of a hydrogenation catalyst selected from the group consisting of Raney nickel deactivated by piperidine, Raney nickel deactivated by a mixture of zinc acetate and piperidine, palladium deactivated by quinoline, and palladium deactivated by pyridine, thereby obtaining said ethylenic hydroxy-ketal in the cis form.

2. A process of preparing an ethylenic hydroxy-ketal consisting of a 5-(2',6',6'-trimethyl cyclohexen-1'-yl) 3-methyl 3-hydroxy 1,1-di-lower alkoxy 4-pentene, comprising converting 1-ethynyl 2,6,6-trimethyl cyclohexene into the corresponding Grignard reagent by reaction with a Grignard reagent having the formula RMgX, in which R is a lower alkyl group and X is a halogen selected from the group consisting of bromine and chlorine, in an ether, condensing said Grignard reagent so formed with a β-ketobutyraldehyde ketal, hydrolyzing the resulting reaction product thereby obtaining a $C_{15}$ acetylenic hydroxy-ketal, and partially hydrogenating the latter by a hydride of aluminum and alkali metal having the formula MeAlH$_4$, in which Me is an alkali metal, thereby obtaining said ethylenic hydroxy-ketal in the trans form.

3. A process as claimed in claim 1, said β-ketobutyraldehyde ketal having the formula CH$_3$COCH$_2$CH(OR$_1$)$_2$, in which R$_1$ is a lower alkyl group.

4. A process as claimed in claim 2, said β-ketobutyraldehyde ketal having the formula CH$_3$COCH$_2$CH(OR$_1$)$_2$, in which R$_1$ is a lower alkyl group.

5. A process as claimed in claim 1, in which said catalytic hydrogenation is carried out in a solvent selected from the group consisting of the lower alkanols, ethyl acetate and petroleum ether, the catalyst being employed in the proportion of about 5 to 20% by weight of the acetylenic hydroxy-ketal.

6. A process as claimed in claim 2, in which the hydrogenation by the hydride of aluminum and alkali metal is effected in tetrahydrofurane.

7. The 5-(2',6',6'-trimethyl cyclohexen-1'-yl) 3-methyl-3-hydroxy-1,1-di-lower alkoxy-4-pentynes.

References Cited

UNITED STATES PATENTS 3,145,233  8/1964  Nicolaux et al. _____ 260—598

OTHER REFERENCES

Redel et al., Compt rend., 259 (15) pp. 2466-8 (1964).

LEON ZITVER, *Primary Examiner.*

H. T. MARS, *Assistant Examiner.*